United States Patent [19]
Jordan

[11] Patent Number: 4,971,352
[45] Date of Patent: Nov. 20, 1990

[54] SUSPENSION ALIGNMENT DEVICE
[76] Inventor: Mark P. Jordan, P.O. Box 4240, Halfmoon, N.Y. 12065
[21] Appl. No.: 399,816
[22] Filed: Aug. 29, 1989
[51] Int. Cl.⁵ .............................................. B62D 17/00
[52] U.S. Cl. ................................................... 280/661
[58] Field of Search ............................... 280/661, 675
[56] References Cited
U.S. PATENT DOCUMENTS

| | | | |
|---|---|---|---|
| 3,526,413 | 9/1970 | Muller | 280/96.2 |
| 3,917,308 | 11/1975 | Schultz | 280/661 |
| 4,313,617 | 2/1982 | Muramatsu et al. | 280/661 |
| 4,424,984 | 1/1984 | Shiratoic et al. | 280/661 |
| 4,577,534 | 3/1986 | Rayne | 81/484 |
| 4,706,987 | 11/1987 | Pettibone et al. | 280/661 |
| 4,733,884 | 3/1988 | Pettibone et al. | 280/661 |
| 4,736,964 | 4/1988 | Specktor | 280/661 |

OTHER PUBLICATIONS

Jordan Application Ser. No. 7/226,618, Suspension Alignment Device, filed Aug. 1, 1988.

*Primary Examiner*—Kenneth R. Rice
*Attorney, Agent, or Firm*—Kevin R. Kepner

[57] ABSTRACT

An alignment adjusting device for an independently suspended vehicle wheel particularly useful for Macphearson strut type suspensions which consists of a one piece pivoting nut-washer combination or nut-pin combination that allows a quick and easy method to adjust camber. The device can be installed with minimal modifications to the vehicle and allows the alignment technician to adjust the camber without the need to remove the alignment instrumentation.

4 Claims, 4 Drawing Sheets

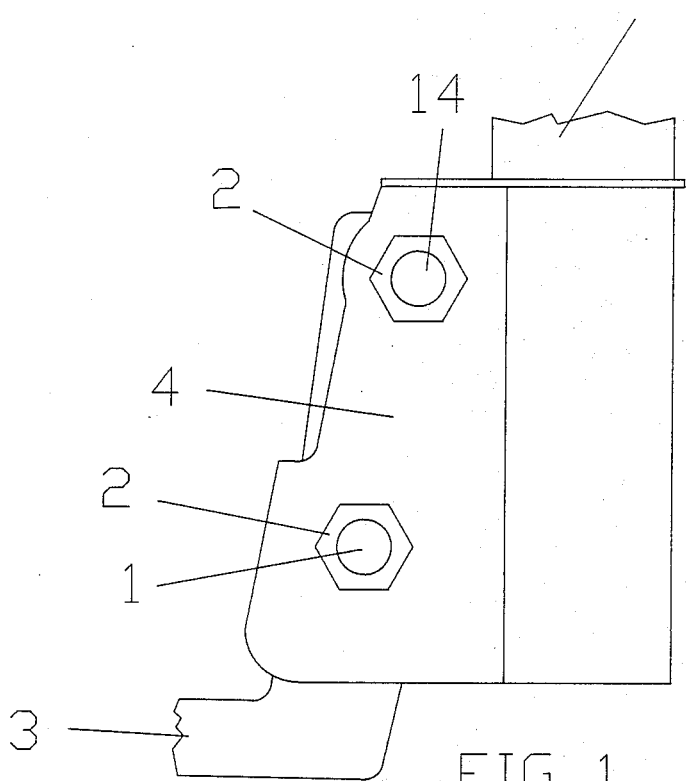
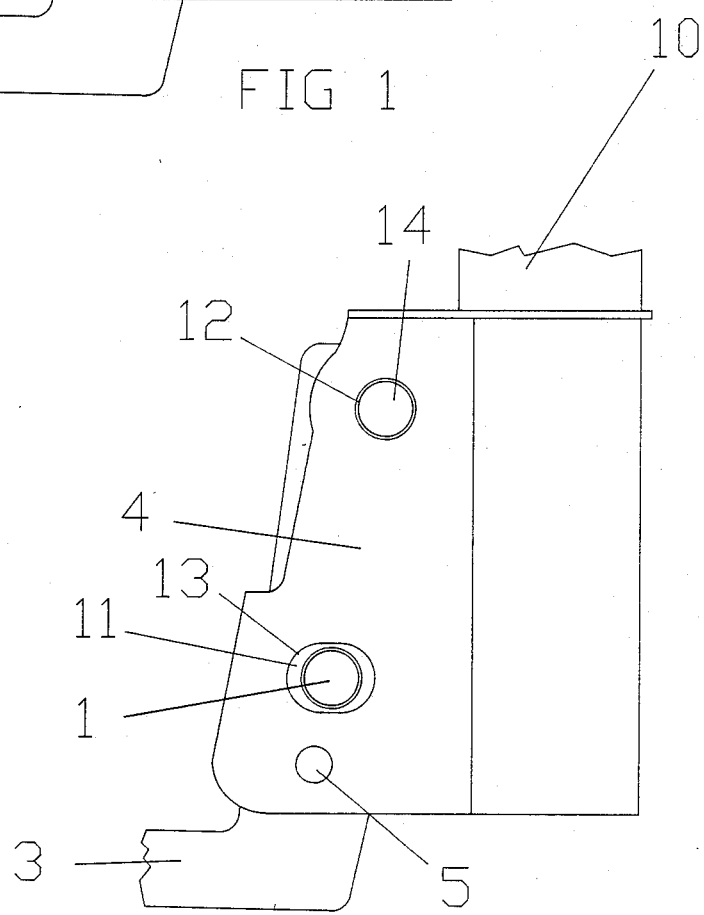

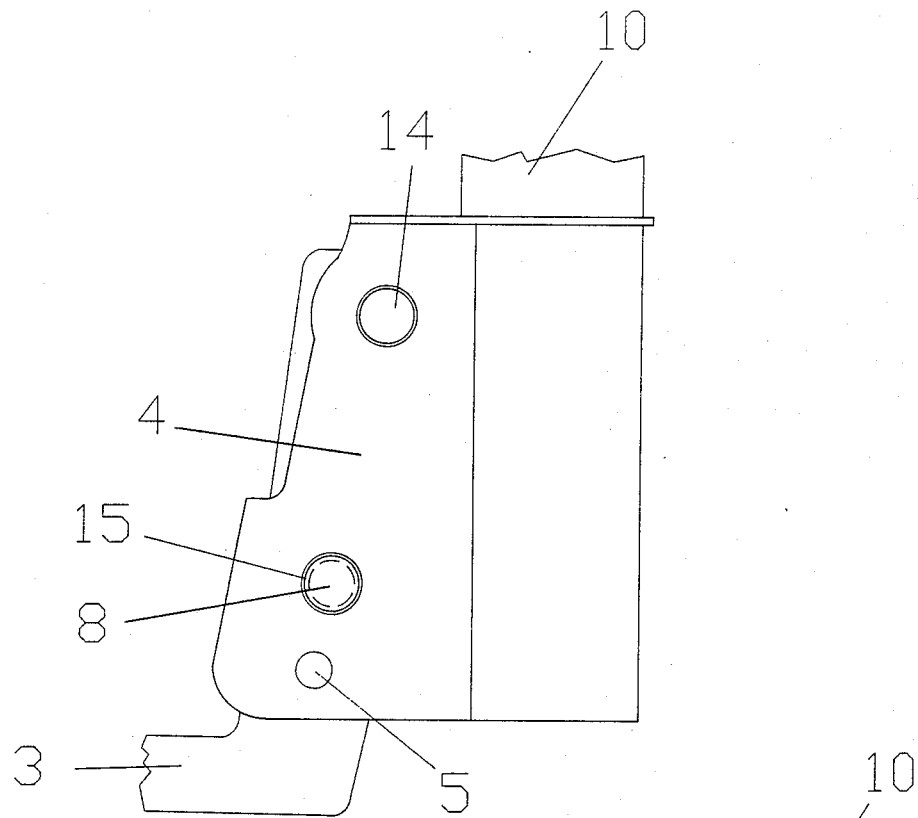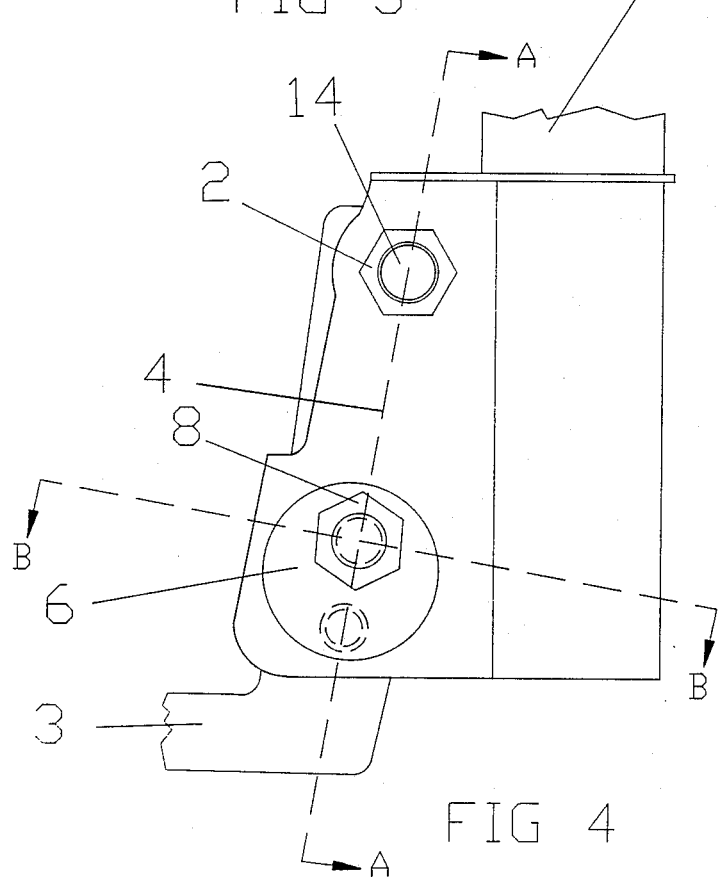

SUSPENSION ALIGNMENT DEVICE

This invention relates to wheel alignment adjusting devices and, more particularly, to a camber and or caster adjusting device for vehicles with independently suspended wheels. Conventional alignment adjusting devices used for adjusting camber, caster, and toe for independently suspended wheels are found in various prior U.S. Patents. All of the following patents use some variation of an eccentric element to obtain the desired alignment adjustment.

Muller U.S. Pat. No. 3,526,413 discloses a camber and caster adjusting device including eccentric elements arranged in the joints of guide members which support the wheel as in what is typically referred to as an A-frame type suspension.

Schultz U.S. Pat. No. 3,917,308 discloses a camber and toe adjusting device for strut-type suspensions utilizing through bolt fasteners holding a clamping bracket on the strut lower end to the neck portion of a wheel support knuckle. An eccentric element is located on one bolt and trapped between guide surfaces on the holding clamp. The eccentric element is rotatably adjustable to force the clamp and knuckle angularly to varying camber relationships.

The Muramutsu et al. U.S. Pat. No. 4,313,617 discloses a camber adjusting device including an an eccentric adjustment piece rotatably provided on the steering knuckle. Rotation of the piece causes the strut support bracket to be displaced about the knuckle by a valve of eccentricity of the piece whereby the strut is displaced with respect to the steering knuckle adjusting the camber angle.

The Shiratori et al. U.S. Pat. No. 4,424,984 discloses a camber adjusting device including a hollow shaft with a disk-shaped cam disposed at one end and a non round fit portion on the other end, an engaging member having a non round hole into which the fit portion of the hollow is inserted and having a cam surface with a profile the same as the end of the hollow shaft, and a bolt which hollow tube is oscillatably supporting a suspension arm by insertion into slots in the fixed supporting member. The bolt is inserted through the hollow tube and into the engaging member, rotation of the engaging member cause a relative displacement of the tube within the mounting slots.

The Rayne U.S. Pat No. 4,577,534 discloses an eccentric cam socket tool which, when engaged with the nut of a through bolt fastener on the strut lower end and related, allows camber adjustment to be obtained.

Pending Jordan U.S. patent application Ser. No. 7/226,618 discloses a camber adjusting device which consists of a one-piece nutwasher washer combination which is rotatably adjustable that allows a quick and easy method to adjust camber.

All of the above mentioned require some surface or shoulder area upon which to react to provide the desired adjustment to be obtained. None of the above mentioned devices allow for adjustment of camber for suspensions on which there is not a raised shoulder or flange upon which the eccentric element can react.

Many automobiles are now being manufactured without the shoulder or flange on the suspension and also many are being manufactured with no built in means of camber or caster adjustment at all. This results in automobile owners being required to frequently replace expensive parts or pay for laboreous bending procedures to achieve a simple and complete wheel alignment. There is currently a patent issued which attempts to address this problem. The Pettibone U.S. Pat. No. 4,706,987 discloses a camber adjusting device which utilizes an eccentric bolt element in combination with a bracket having parallel flanged surfaces upon which the eccentric element is rotatably adjustable, thereby providing a means for camber adjustment. In practice however, it is usually the bracket which is displaced rather than the camber adjustment and the use of the invention in many instances requires the removal of the wheels of the auto, the removal of the alignment equipment and often requires modification of the actual strut flange

SUMMARY OF INVENTION

It is an object of present invention to provide an effective, inexpensive and easily installed device for the adjustment of the suspension to which it is applied thus overcoming the disadvantages of prior art described above.

It is an additional advantage of this invention that it can be installed without removing the wheel alignment equipment or the wheel of the vehicle upon which it is being installed. This enables the technician making the adjustment to perform the entire alignment adjustment without the necessity of multiple equipment hook-ups. This invention can, in one of its embodiments, also be easily installed on suspensions which have no factory adjustment slots in the strut flange and in all of its embodiments, installation is achieved with only a minimal modification to the strut flange, that being the drilling of a small diameter hole in one leg of the flange. It is a further advantage that this invention, when installed, does not require great force to be applied such as is required to engage the socket-type adjusting device mentioned above. The preferred embodiment described herein is particularly suitable to strut-type suspensions, however, it is not limited thereto as other applications are readily apparent.

BRIEF DESCRIPTION OF THE DRAWINGS

FIG. 1 is a side view showing a typical example of the clamp arrangement at the lower end of a strut in a strut-type suspension into which the camber adjusting device is assembled;

FIG. 2 is a side view showing a typical example of the clamp arrangement at the lower end of a strut in a strut-type suspension with the modification hole drilled in the clamp leg into which the camber adjusting device is assembled;

FIG. 3 is a side view showing a typical example of the clamp arrangement at the lower end of a strut in a strut-type suspension with the modification hole drilled in the clamp leg and the modified reduced diameter clamping bolt installed into which the camber adjusting device is assembled;

FIG. 4 is a side view of FIG. 3 showing the pivoting nut-washer camber adjusting device installed;

DESCRIPTION OF THE PREFERRED EMBODIMENTS

Figure 5:
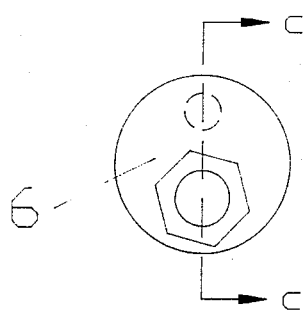
FIG. 5 is a side view of the pivoting nut-washer camber adjusting device.

With reference to FIG. 1, it is seen that the front wheel of a motor vehicle is coupled to the vehicle frame or structure by means of a Macphearson strut member 10, a clampable mounting link 4 and a wheel support member 3 or steering knuckle. The clampable mounting link 4 is generally a U-shaped member and is attached around the lower end of the strut member 10, the wheel support member is then retained by means of two through bolts 14 and 1 which pass through the legs 4 of the mounting link between which the support member 3 is positioned. The lower mounting hole 11 in the support member 3 is positioned in vertical alignment with the upper mounting hole 12. The lower holes 13 in the mounting link legs 4 are horizontal slots In the preferred embodiment, the camber adjustment is robotically set at the factory and the clampable mounting link 4 is attached to the wheel support member by means of conventional hex head through bolts 1, and nuts 2. This is accomplished by the precise movement of the lower through bolt 1 in the lower mounting slots 13 which rotates the wheel support 3 about the pivot point of the upper mounting bolt 14 thereby achieving the desired camber setting.

To provide post assembly camber adjustment, it is generally necessary to loosen the upper 14 and lower 1 mounting bolts and to physically manipulate the wheel support 3 until the proper camber setting is obtained. This manipulation requires the presence of two persons and, due to the weight of the wheel components, it is difficult to maintain the proper setting once reached while the bolts are being tightened.

Figure 6:
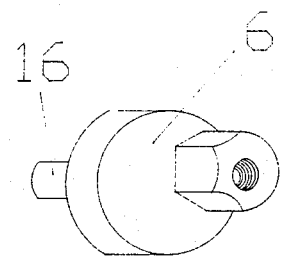
FIG. 6 is a perspective view of the pivoting nut-washer device.
Figure 14:
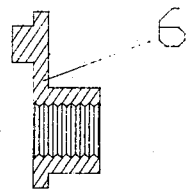
FIG. 14 is a sectional view taken along line cc of FIG. 5.

As shown in FIG. 4, the preferred embodiment provides a pivoting adjusting element 6, which is detailed in FIGS. 5, 6 and 14 in the form of a nut-washer combination 6, which replaces the standard nut 2. The nut portion of the device is rotatably adjustable with regard to the pin 16 secured to the washer which is inserted in the hole 5 drilled in the mounting link 4. As the device 6 is rotated, the mounting bolt is displaced horizontally in the lower mounting slot 13 until the proper camber setting is obtained. Once the proper setting is obtained, the adjusting device 6 can be held in position by means of a standard socket-type or open end wrench and the bolt 1 can be tightened from the bolt-head side. This embodiment enables the proper post assembly camber setting to be obtained and the mounting bolts to be tightened by a single individual.

It is also within the scope of this invention to perform the camber adjustment by the horizontal displacement of the top mounting bolt with the pivot point located at the bottom bolt.

In a second embodiment of the invention shown in FIG. 3 the lower holes 15 in the mounting link legs 4 are round. In this embodiment, the camber adjustment is permanently set at the factory and the clampable mounting link 3 is attached to the wheel support member by means of conventional hex head through bolts 1, and nuts 2. To provide post assembly camber adjustment, it is generally necessary to either replace various parts of the suspension or to perform laborious bending procedures on the parts to achieve the proper camber setting. This procedure is very expensive and requires disassembly of the suspension, wheels, etc.

Figure 7:
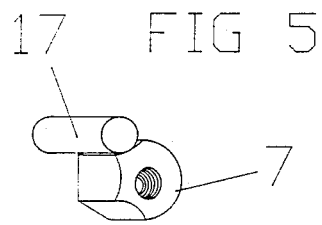
FIG. 7 is a perspective view of the nut-pin pivoting camber adjusting device.
Figure 8:
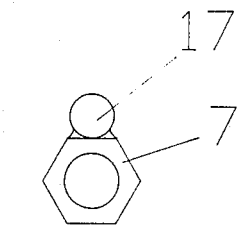
FIG. 8 is a side view of the nut-pin pivoting camber adjusting device.
Figure 9:
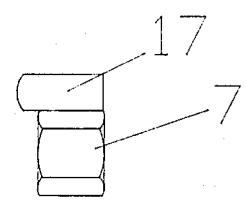
FIG. 9 is an end view of the nut-pin pivoting camber adjusting device.
Figure 10:
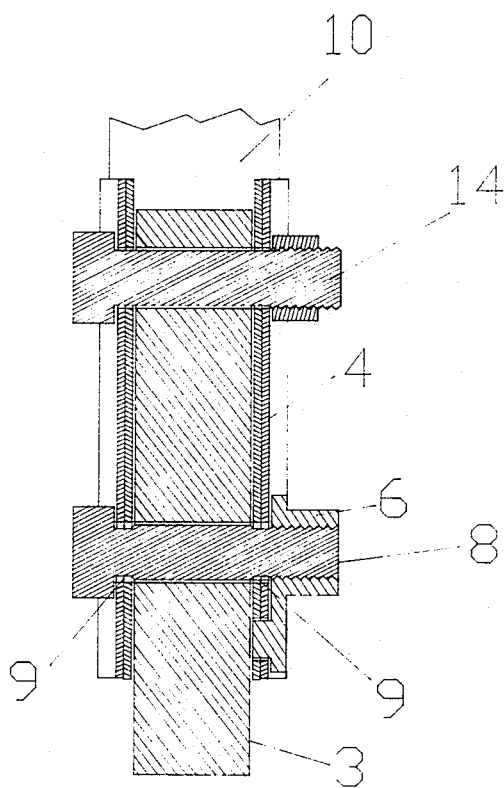
FIG. 10 is, a sectional view taken along line aa of FIG. 4.
Figure 11:
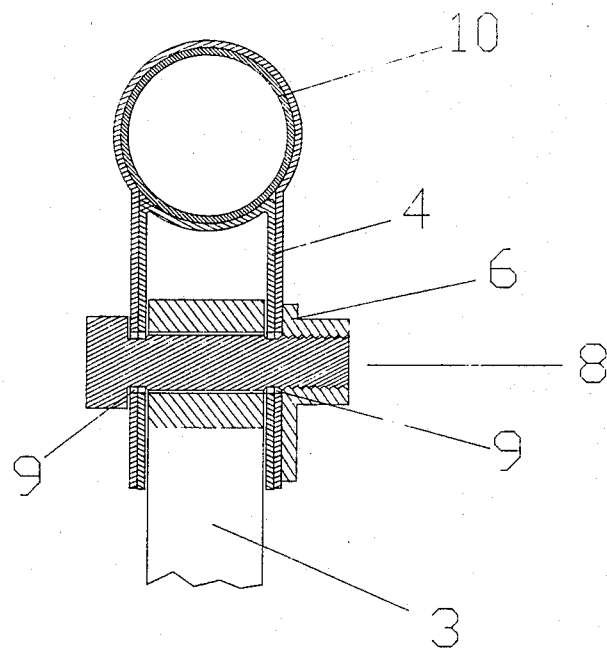
FIG. 11 is a sectional view taken along line bb of FIG. 4.
Figure 12:
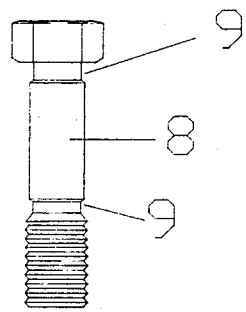
FIG. 12 is a side view of the modified reduced diameter clamp bolt.
Figure 13:
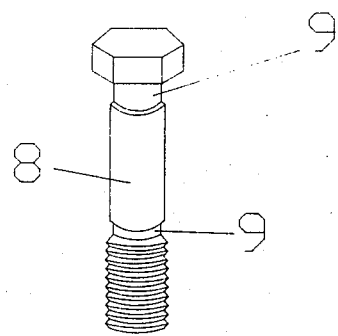
FIG. 13 is a perspective view of the modified reduced diameter clamp bolt.

As shown in FIG. 4, the preferred embodiment provides a pivoting adjusting element 6, which is detailed in FIGS. 5, 6 and 14 in the form of a nut-washer combination 6 or nut-pin combination 7 FIGS. 7, 8 and 9, which replaces the standard nut 2, in addition the lower mounting bolt 8 is reduced in diameter to substantially the root diameter of the threads in the areas 9 on the bolt which coincide with the flange walls as shown in FIGS. 10, 11, 12 and 13. The pivoting device 6 or 7 is rotatably adjustable with regard to the pin 16 or 17 which inserted in the hole 5 drilled in the mounting link 4. As the device 6 or 7 is rotated, the modified mounting bolt 8 is displaced horizontally in the lower mounting hole 15, which displacement is allowed by virtue of the reduced diameter area 9 of the bolt, until the proper camber setting is obtained. Once the proper setting is obtained, the adjusting device 6 can be held in position by means of a standard socket-type or open end wrench and the modified bolt 8 can be tightened from the bolt-head side. This embodiment enables the proper post assembly camber setting to be obtained and the mounting bolts to be tightened by a single individual. It is also within the scope of this embodiment of the invention to perform the camber adjustment by the horizontal displacement of the top mounting bolt with the pivot point located at the bottom bolt.

Although only two embodiments of the invention have been disclosed and described, it is readily apparent that other embodiments and modifications to various types of independent suspensions are possible without departing from the scope of this invention.

What is claimed is:

1. A device for adjusting the alignment of the independently suspended wheels of a vehicle, said wheels supported on said vehicle frame by a link coupling means and a wheel support means comprising means for oscillatably supporting said wheel support means into a slot in said link coupling means securedly fixed to said vehicle by bolt means extending through said link coupling means and said wheel support means and alignment adjustment means comprising a one piece pivoting nut-washer combination rotatably adjustable in said link coupling means, said nut-washer combination comprising a washer securedly affixed to a nut with the hole aligned with the threaded bore of the nut, said washer having a round pivot pin perpendicularly affixed to the flat side of said washer opposite the side securedly affixed to said nut, said pivot pin axis being parallel to but not in alignment with said threaded bore of said nut.

2. The device as claimed in claim 1 for adjusting the camber of a wheel of said vehicle wherein said link coupling means comprises the lower strut flanges of a Macphearson strut means which is securedly fixed to said vehicle and an upper and lower set of substantially horizontal bores in said wheel support means corresponding to an upper bore and a lower horizontal slot in said strut flanges means coaxially aligned with the axis of said lower bore in said wheel support means, wherein said wheel support means comprises a steering knuckle and wherein said alignment adjustment means is rotatably adjustable relative to said pivot pin means inserted in a hole drilled in said strut flange.

3. A device for adjusting the alignment of the independently suspended wheels of a vehicle, said wheels supported on said vehicle frame by a link coupling means and a wheel support means comprising means for oscillatably supporting said wheel support means into a substantially round hole in said link coupling means securely fixed to said vehicle by modified bolt means extending through said link coupling means and said wheel support means and alignment adjustment means comprising a one piece pivoting nutpin combination rotatably adjustable in said link coupling means, said modified bolt means comprising a bolt with the diameter of said bolt reduced to substantially the root diameter of said bolt in the area on said bolt which aligns with said link coupling means, said pivoting nut-pin combination comprising a pivot pin axially parallel to but not in alignment with the threaded bore of the nut said pivot pin being securedly affixed to one of the six flat sides of said nut and said pivot pin being axially longer than the height of said nut.

4. The device as claimed in claim 3 for adjusting the camber of a wheel of said vehicle wherein said link coupling means comprises the lower strut flanges of a Macphearson strut means which is securedly fixed to said vehicle and an upper and lower set of substantially horizontal bores in said wheel support means corresponding to an upper bore and a lower bore in said strut flanges means aligned with the said lower bore in said wheel support means, wherein said wheel support means comprises a steering knuckle and wherein said alignment adjustment means is rotatably adjustable relative to a said pivot pin means inserted in a hole drilled in said strut flange.

* * * * *